United States Patent [19]

Lynch

[11] Patent Number: 4,674,786
[45] Date of Patent: Jun. 23, 1987

[54] HAY BALE SPIKE ASSEMBLY
[75] Inventor: Bobby R. Lynch, Ozark, Mo.
[73] Assignee: TRI-L Manufacturing, Inc., Ozark, Mo.
[21] Appl. No.: 890,107
[22] Filed: Jul. 28, 1986
[51] Int. Cl.⁴ ............................................. A01D 87/12
[52] U.S. Cl. ..................................... 294/120; 294/61; 414/24.5
[58] Field of Search ................ 294/120, 122, 126, 61, 294/121, 125; 414/24.5

[56] References Cited
U.S. PATENT DOCUMENTS

| | | | |
|---|---|---|---|
| 4,090,616 | 5/1978 | Runyan et al. | 414/24.5 |
| 4,583,900 | 4/1986 | Cooley | 294/121 |

Primary Examiner—James B. Marbert
Attorney, Agent, or Firm—Harold F. Mensing

[57] ABSTRACT

A forklift type assembly for impaling, lifting and carrying a large round bale of hay. The assembly has a backframe with adjustable means for mounting it on the lift mechanism of a small farm tractor. A tubular sheath with a brace on its underside projects from the front of the frame. The rear end of a bale spike, made of a high tensile strength steel rod having a pointed tip, is removably mounted in the sheath. Also mounted on the frame below the sheath and on each side thereof are two forwardly projecting auxiliary bale spikes of reduced length.

29 Claims, 5 Drawing Figures

HAY BALE SPIKE ASSEMBLY

BACKGROUND OF THE INVENTION

Devices for impaling, lifting and carrying large rolled bales of hay have been developed in the past. A typical rolled bale of hay contains in excess of 1500 pounds of densely packed hay formed into a solid cylindrical shape having a diameter of five feet and an axial length also of five feet. A common difficulty encountered by these prior art devices was that the bale spikes would become bent when overloaded or abused. Obvious ways to overcome the problem was to increase the number of spikes, make the spikes out of larger diameter rods or by welding braces on them. However, these solutions all increased the cross sectional area of the bale penetrating members substantially and thus increased the force required to drive them into a bale. Another solution to the problem was to use a high tensile strength rod for the main bale spike. This solution was not entirely satisfactory because when the required bracing was welded on the spike it weakened the spike itself. The weakened assembly could be restrengthened by heat treating but the cost of doing so would be excessive.

Accordingly, it is a primary object of this invention to provide a high strength bale spike assembly in which the rear portion of the main bale spike is removably housed in a buttressed sheath projecting forwardly from a supporting backframe.

An ancillary but important advantage of having a removable main bale spike is that the overall dimensions of the assembly are reduced by removal of the bale spike thus facilatating its shipping and storage.

SUMMARY OF THE INVENTION

This invention relates to an improved forklift assembly capable of being mounted on a lift mechanism of a small conventional farm tractor for the purpose of impaling, lifting, and carrying rolled bales of hay. More specifically, it relates to such a forklift assembly having a flat backframe with a forwardly projecting buttressed sheath for removably holding the rear portion of a main bale spike. The backframe is comprised of a normally horizontally disposed beam member with an integrally attached vertical pillar extending upwardly from its center. The sheath extends through the backframe and is supported by a gusset welded to its underside and to the vertical pillar. Two spaced apart auxiliary bale spikes of reduced size are mounted on the backframe below the main bale spike and on opposite sides thereof. Adjustable mounting brackets are provided so that the bale spike assembly can be readily mounted on any one of a wide variety of farm tractor lift mechanisms.

The invention will be understood best if the detailed description is read in conjunction with the accompanying drawings.

A DETAILED DESCRIPTION OF THE INVENTION

Figure 1:
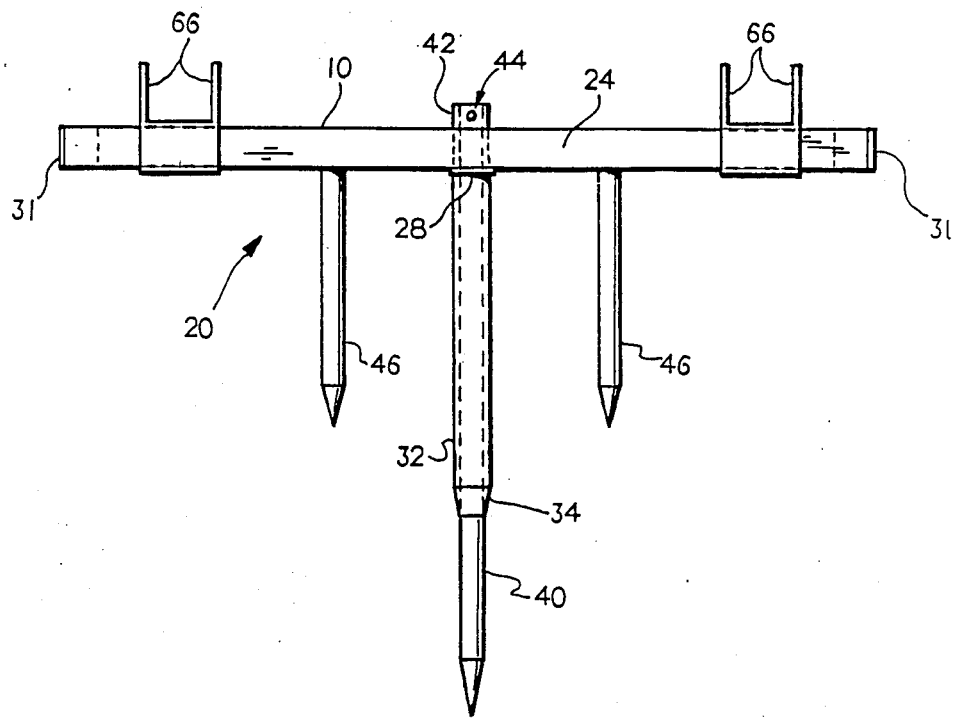
FIG. 1 is a plan view of a preferred embodiment of the bale spike assembly designed for attachment to front end loader arms.
Figure 2:
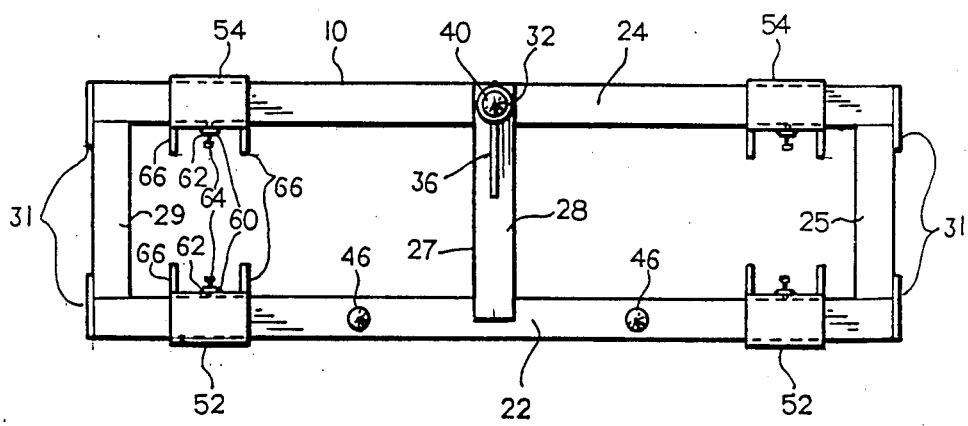
FIG. 2 is a front elevation view of FIG. 1.
Figure 3:
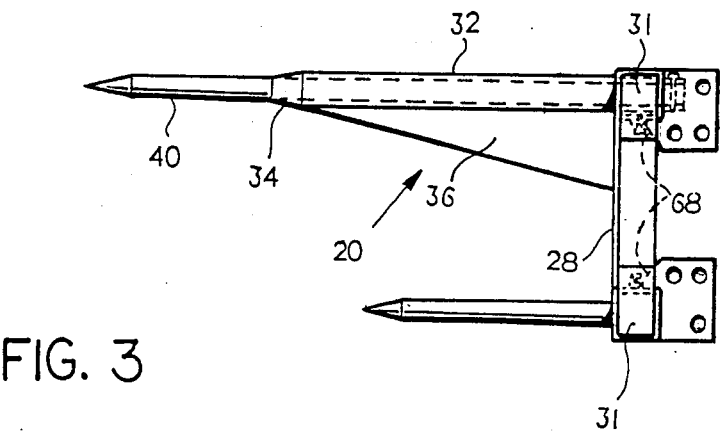
FIG. 3 is a side elevation view of FIG. 1.

The backframe 10 of the bale spike assembly 20 illustrated in FIGS. 1-3 is constructed of tubular members made of mild steel preferably having rectangular or square cross sections with their flat front walls arranged in a plane. For ease of description it will be assumed that the face of the backframe is disposed in a vertical plane. The frame is comprised of two horizontally disposed vertically spaced apart parallel beam members 22,24 and three vertical pillar members 25, 27, 29. The three pillars are equal in length and extend from the top wall of the bottom beam member 22 to the bottom wall of the top member 24. One of the pillar members 27 is located midway between the ends of the beam members 22,24 and the remaining two pillar members have their outside walls flush with the ends of the beam members. Preferably central pillar 27 includes a steel reinforcing face plate 30 welded over its frontal surface. Plate 28 extends from the top of beam member 24 to the center of beam member 22. The backframe members are joined together by welding to produce a rigid one-piece backframe. Preferably the four corners of the frame are further reinforced by end plates 31 which cover the open ends of the beam members 22, 24 and extend a short distance over portions of the outside walls of the pillar members 25, 29.

A tubular bale spike sheath 32 is mounted between the top and bottom walls of the top beam member 24 directly over the centerline of the central pillar 27. It projects forwardly from the backframe face at right angles thereto a distance equivalent to at least 12 times the diameter of the main bale spike and also extends through the rear wall of the beam a distance of about one diameter. The forward end 34 of the sheath is tapered at an angle of about 10° for a distance of about one diameter. An elongated triangular gusset 36 extends rearwardly along the underside of the sheath 32 from the base of the tapered section 34 to the front face of the central pillar 27. The top edge of the gusset is welded to the sheath and a major portion of its rear edge is welded to the face of the central pillar. However, a short portion of the top of the rear edge extends above the central pillar where it is welded to the horizontal beam member. The ratio of the length of the top edge of the gusset to its height is preferably between 3:1 and 4:1.

The main bale spike 40 preferably is made of high tensile strength steel rod having a circular cross section. Rods having triangular, rectangular or square cross sections may be used provided they have comparable cross sectional areas and lengths. A typical bale spike, such as the one illustrated in the drawings, has a diameter of two inches and a total length equivalent to twenty-four diameters or forty-eight inches. Of this length about two inches projects rearwardly beyond the back of the top beam member 24, three inches is contained within the beam member and the remaining forty-three inches projects forwardly from the face of the beam member. More than half of the forwardly projecting portion of the bale spike 40 is contained in the forwardly projecting portion of the sheath 32. The forwardly projecting sheathed portion of the bale spike exceeds its unsheathed length by about 25%. For example, in the illustrated bale spike assembly the unsheath length is nineteen inches and the forwardly projecting sheathed portion is twenty-four inches long. The forward tip of the bale spike is tapered to a point of an angle of approximately 10°. The short rearwardly projecting portion of the bale spike and the surrounding rearwardly projecting stub section 42 of the sheath have aligned apertures for a removable retainer pin or bolt 44 which fixes the bale spike in the sheath and prevents relative axial movement between these members. Two auxiliary bale spikes 46 having pointed tips are mounted in the lower beam member 22 at locations equidistant from its center. They are parallel with one another and are disposed in a plane perpendicular to the backframe face. The distance between their centers is preferably greater than the center distance between either of them and the main bale spike. Since this bale spike assembly is designed to have the majority of the weight of a hay bale supported by the main bale spike 40, the auxiliary bale spikes may be mild steel rods of lesser diameter supported entirely at their rear ends which extend through both the front and rear walls of the lower beam member where they are permanently affixed by welding. The auxiliary bale spikes 46 project forwardly a distance that is substantially less than the length of the unsupported portion of the main bale spike 40. Although they are designed to bear some of the load their primary function is to prevent rotational movement of a bale around the main bale spike particularly when the main bale spike has not been centered in the bale by an operator.

Prior to the time the outside vertical pillars 25, 29 are attached to the beam members, lower and upper pairs of slidable mounting brackets 52, 54 are positioned on their respective beam members 22, 24. Preferably their slidable base sections 56 are made of tubing having an internal opening that corresponds with the cross sectional shape of the outside of the beam members and is sized to provide a slip fit. For example, where the beam members are made of three inch square tubing, the base sections may be made of three and one-half inch tubing having three sixteenth inch thick walls. Means 60 are provided to adjustably fix the mounting brackets 52, 54 at selected locations along the beam members. The means 60 illustrated in the drawings comprises an aperture through the inside wall of each bracket at its midpoint, a coaxially aligned nut 62 welded around the aperture and a hex headed set screw 64 threaded in the nut.

Rearwardly protruding clevis plates 66 are welded to each mounting bracket at opposite ends thereof. All of the plates are basically rectangular in shape and identical in size. One-half of each plate extends beyond the inside wall of its sliding tubular base portion 56 and has an angular strut section 68 which extends forwardly over the rear half of the inside wall of the base section. Two apertures 69 are provided in the rear half and one aperture is provided in the front half of each plate. All of the apertures are equally spaced from their adjoining edges.

Figure 4:
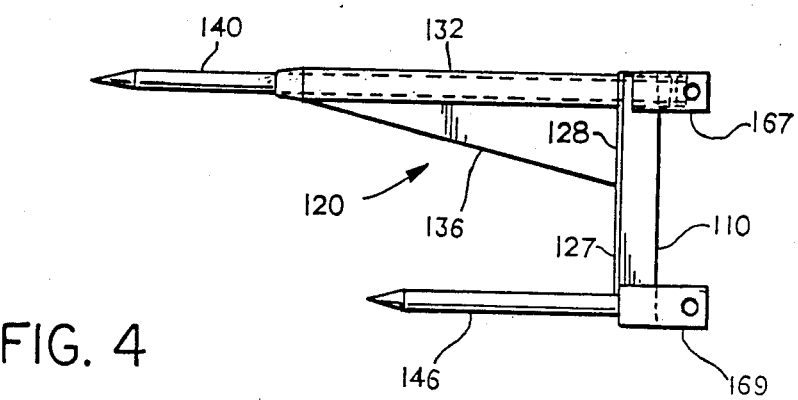
FIG. 4 is a side elevation view of another embodiment of the bale spike assembly designed for three-point hitch mechanisms.
Figure 5:
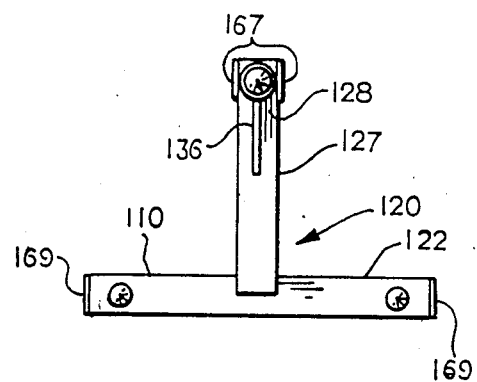
FIG. 5 is a front elevation view of FIG. 4.

The bale spike assembly 120 shown in FIGS. 4 and 5 has many features which are similar to those described with respect to the previous embodiment. For the sake of brevity they will not be redescribed here except where it is necessary or helpful for a complete understanding of this embodiment. Elements that are common to both embodiments will be designated by a one hundred series number with the last two digits being the same for each embodiment.

The embodiment illustrated in the last two Figs. is designed for use with a conventional three point hitch system. The backframe 110 comprises a single horizontal beam member 122 and a single vertical pillar member 127 extending upwardly from its midpoint. In order to maintain the same relative center distances between the primary spike 140 and the two auxiliary spikes 146, as in the previously described embodiment 20, pillar member 127 is lengthened to compensate for the omission of the top horizontal beam member and the rearward end of the main bale spike sheath 132 is located in the extended top portion of pillar member 127. Likewise the relative dimensions of the faceplate 128, sheath 132, gusset 136, primary spike 140 and auxiliary spikes 146 are the same as those of the corresponding elements of embodiment 10.

The mounting means is fixed rather than adjustable and comprises a pair of rearwardly extending clevis plates 167 welded to the sides of the top end of pillar member 127 and a similar pair of plates 169 welded to the ends of beam member 122. Each of the plates has a single aperture for a removable mounting pin.

The above invention has been described with respect to its best mode and only two embodiments have been illustrated. However, it is to be understood that variations will be apparent to those skilled in the art and thus the scope of the invention is established primarily by the appended claims.

What is claimed is:

1. A bale spike support assembly comprising: a frame having a beam member and at least one laterally disposed pillar member connected to a central portion of said beam member, said frame having a front side and a rear side, a pair of auxiliary bale spikes projecting forwardly from said front side, said spikes being mounted on said beam member at locations equidistant from said pillar member, a tubular sheath projecting forwardly from said front side a distance that is greater than the projected length of said auxiliary bale spikes, an elongated triangular gusset having one edge rigidly connected along the beam side of said sheath with another edge rigidly connected to said pillar member, and a means for removably anchoring a main bale spike in said sheath.

2. A bale spike support assembly according to claim 1 wherein the length of the gusset edge attached to said sheath is between three and four times the length of the edge attached to said pillar member.

3. A bale spike support assembly according to claim 2 wherein the forward end of said sheath is tapered towards its center and the forward end of said gusset terminates at the rear end of the tapered section.

4. A bale spike support assembly according to claim 1 wherein said pillar member includes an integrally attached steel face plate on its frontal surface, said face plate extends beyond the ends of said pillar member.

5. A bale spike support assembly according to claim 1 wherein said frame is made of tubular members having square cross sections, said frame further includes a second beam member which is spaced from and disposed parallel to said first beam member, said pillar member is rigidly connected to a central portion of said second beam member and two additional pillar members are rigidly connected to said first and second beam members adjacent to their ends, said tubular members having flat frontal surfaces disposed in a plane.

6. A bale spike support assembly according to claim 5 wherein said sheath extends through said second beam member.

7. A bale spike support assembly according to claim 5 wherein said frame has reinforcing plates which cover the ends of the beams and extend over adjoining coplanar portions of said two additional pillar members.

8. A bale spike support assembly according to claim 5 further including a first pair of brackets for mounting said assembly on a vehicle, said brackets being adjustably connected to said first beam member and a second pair of brackets adjustably connected to said second beam member, and first and second pairs being independently adjustable.

9. A bale spike support assembly according to claim 8 wherein said mounting brackets have base members which circumscribe said beam members and are slidable thereon independently of one another.

10. A bale spike support assembly according to claim 1 wherein the center distance between said sheath and either of said auxiliary spikes is greater than the center distance between said spikes.

11. A bale spike support assembly according to claim 1 wherein said sheath also extends through said frame to a stub section protruding from the rear side thereof, and said anchoring means is in said stub section.

12. A bale spike support assembly comprising: a frame having a beam member and at least one laterally disposed pillar member connected to a central portion of said beam member, said frame having a front side and a rear side, a pair of auxiliary bale spikes projecting forwardly from said front side, said spikes being mounted on said beam member at locations equidistant from said pillar member, a tubular sheath projecting forwardly from said front side, said sheath also extends through said frame to a stub section protruding from the rear side thereof, an elongated triangular gusset having one edge rigidly connected along the beam side of said sheath with another edge rigidly connected to said pillar member, and a means in said stub section for removably anchoring a main bale spike in said sheath.

13. A bale spike support assembly according to claim 12 wherein the length of the gusset edge attached to said sheath is between three and four times the length of the edge attached to said pillar member.

14. A bale spike support assembly according to claim 13 wherein the forward end of said sheath is tapered towards its center and the forward end of said gusset terminates at the rear end of the tapered section.

15. A bale spike support assembly according to claim 12 wherein said pillar member includes an integrally attached steel face plate on its frontal surface, said face plate extends beyond the ends of said pillar member.

16. A bale spike support assembly according to claim 12 wherein said frame is made of tubular members having square cross sections, said frame further includes a second beam member which is spaced from and disposed parallel to said first beam member, said pillar member is rigidly connected to a central portion of said second beam member and two additional pillar members are rigidly connected to said first and second beam members adjacent to their ends, said tubular members having flat frontal surfaces disposed in a plane.

17. A bale spike support assembly according to claim 16 wherein said sheath extends through said second beam member.

18. A bale spike support assembly according to claim 16 wherein said frame has reinforcing plates which cover the ends of the beams and extend over adjoining coplanar portions of said two additional pillar members.

19. A bale spike support assembly according to claim 16 further including a first pair of brackets for mounting said assembly on a behicle, said brackets being adjustably connected to said first beam member and a second pair of brackets adjustably connected to said second beam member, said first and second pairs being independently adjustable.

20. A bale spike support assembly according to claim 19 wherein said mounting brackets have base members which circumscribe said beam members and are slidable thereon independently of one another.

21. A bale spike support assembly according to claim 12 wherein the center distance between said sheath and either of said auxiliary spikes is greater than the center distance between said spikes.

22. A bale spike support assembly comprising: a backframe having a beam member, at least one laterally disposed pillar member connected to a central portion of said beam member, said backframe having a front side and a rear side, said pillar member includes an integrally attached face plate on its frontal surface, said faceplate extends beyond one end of said pillar over a portion of said beam member, a pair of auxilary bale spikes projecting forwardly from said front side, said spikes being mounted on said beam member at locations equidistant from said pillar member, a tubular bale spike sheath projecting forwardly from said front side parallel to said auxilary bale spikes a distance greater than the projected length of said auxilary bale spikes, said sheath having a forwardly converging tapered section on its forward end, an elongated triangular gusset having one edge integrally connected along the beam side of said sheath with another edge integrally connected to said pillar member, said gusset extending forwardly to the base of said tapered section, said edge integrally attached to said sheath having a length that is between three and four times greater than that of the edge connected to said pillar, a means for removably anchoring a main bale spike in said sheath, and means for mounting said support assembly on a vehicle.

23. A bale spike support assembly according to claim 22 wherein said sheath extends through said backframe to a stub section protruding from the rear side thereof, and said anchoring means is in said stub section.

24. A bale spike assembly according to claim 22 wherein the center distance between said sheath and either of said auxilary spikes is greater than the center distance between said spikes.

25. A bale spike support assembly according to claim 22 wherein said backframe is made of tubular members having square cross sections, said backframe further includes a second beam member which is spaced from and disposed parallel to said first beam member, said pillar member is rigidly connected to a central portion of said second beam member and two additional pillar members are rigidly connected to said first and second beam members adjacent to their ends, said tubular members having flat frontal surfaces disposed in a plane.

26. A bale spike support assembly according to claim 22 wherein said sheath extends through said second beam member.

27. A bale spike support assembly according to claim 22 wherein said backframe has reinforcing plates which cover the ends of the beams and extend over adjoining coplanar portions of said two additional pillar members.

28. A bale spike support assembly according to claim 22 wherein said mounting means includes a first pair of brackets adjustably connected to said first beam member and a second pair of brackets adjustably connected to said second beam member.

29. A bale spike support assembly according to claim 28 wherein said mounting brackets have base members which circumscribe said beam members and are slidable thereon independently of one another.

* * * * *